(12) United States Patent
Billman et al.

(10) Patent No.: US 12,100,041 B1
(45) Date of Patent: Sep. 24, 2024

(54) FINANCIAL EDUCATION TOOL SYSTEMS AND METHODS

(71) Applicant: United Services Automobile Association (USAA), San Antonio, TX (US)

(72) Inventors: Bradly Jay Billman, Celina, TX (US); Dwayne Phillip Wilson, Crossroads, TX (US); Jennifer Anne Scamardo, Frisco, TX (US); Zachery C. Lake, Aubrey, TX (US); Judy Thu Switzer, Frisco, TX (US); Timothy Benjamin Czerlinsky, Plano, TX (US); Ethan Robinson, Plano, TX (US); Patrick Emmanuel Gaston, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 275 days.

(21) Appl. No.: 17/392,124

(22) Filed: Aug. 2, 2021

(51) Int. Cl.
  *G06Q 40/00* (2023.01)
  *G06F 3/0488* (2022.01)
  (Continued)

(52) U.S. Cl.
  CPC .......... *G06Q 40/02* (2013.01); *G06F 3/0488* (2013.01); *G06Q 20/108* (2013.01);
  (Continued)

(58) Field of Classification Search
  CPC .. G06Q 40/02; G06Q 20/108; G06Q 20/3221; G06Q 20/3223; G06Q 20/40145;
  (Continued)

(56) References Cited

U.S. PATENT DOCUMENTS 8,005,742 B2 * 8/2011 Heiges ................. G06Q 40/10
  705/35
10,022,632 B1 * 7/2018 McAdoo ............... G06Q 30/06
  (Continued)

OTHER PUBLICATIONS

PROTOCOL: Interventions designed to improve financial capability by improving financial behavior and financial access: A systematic review; Campbell Systematic Reviews, 15(1-2), e1020; Birkenmaier, Julie; Maynard, Brandy; Kim, Youngmi; Jul. 19, 2019. (Year: 2019).*

*Primary Examiner* — Tien C Nguyen
(74) *Attorney, Agent, or Firm* — Fletcher Yoder, P.C.

(57) ABSTRACT

A financial education tool includes a body portion, a basin disposed within the body portion, and a receptacle into the body portion. The receptacle is configured to receive physical currency into the basin. The financial awareness tool includes a counter configured to detect receipt of the physical currency into the basin, a display, and a user interface configured to receive a user input from a user. The financial awareness tool includes a processor communicatively coupled to the display and the user interface, where the processor is configured to communicate with a server configured to manage a banking account of the user. The processor is configured to, in response to receiving the user input at the user interface, detecting receipt of the physical currency by the counter, or both, instruct the display to display information relating to the banking account of the user.

20 Claims, 3 Drawing Sheets

(51) Int. Cl.
| | |
|---|---|
| *G06Q 20/10* | (2012.01) |
| *G06Q 20/32* | (2012.01) |
| *G06Q 20/40* | (2012.01) |
| *G06Q 40/02* | (2023.01) |
| *G06V 40/13* | (2022.01) |
| *G07D 11/14* | (2019.01) |
| *G07D 11/50* | (2019.01) |
| *G07D 11/60* | (2019.01) |
| *G09B 5/06* | (2006.01) |
| *G09B 19/18* | (2006.01) |

(52) U.S. Cl.
CPC ..... *G06Q 20/3221* (2013.01); *G06Q 20/3223* (2013.01); *G06Q 20/40145* (2013.01); *G06V 40/13* (2022.01); *G07D 11/14* (2019.01); *G07D 11/50* (2019.01); *G07D 11/60* (2019.01); *G09B 5/06* (2013.01); *G07D 2211/00* (2013.01); *G09B 19/18* (2013.01)

(58) Field of Classification Search
CPC ...... G06F 3/0488; G06V 40/13; G07D 11/14; G07D 11/50; G07D 11/60; G07D 2211/00; G09B 5/06; G09B 19/18

USPC ............ 705/42, 38, 39, 40, 37, 26; 235/380, 235/379; 717/108; 709/226; 715/704; 719/315; 726/9, 6

See application file for complete search history.

(56) References Cited

U.S. PATENT DOCUMENTS

| | | | | |
|---|---|---|---|---|
| 2001/0054643 | A1* | 12/2001 | Siemens | G07D 11/12 235/379 |
| 2008/0275823 | A1* | 11/2008 | Cali | G06Q 40/06 705/36 R |
| 2008/0281721 | A1* | 11/2008 | Simunovic | G06Q 40/02 705/42 |
| 2013/0346309 | A1* | 12/2013 | Giori | G06Q 20/3223 705/43 |
| 2015/0017611 | A1* | 1/2015 | Moumneh | G06V 40/166 434/107 |
| 2016/0342992 | A1* | 11/2016 | Lee | G06Q 20/367 |

* cited by examiner

FINANCIAL EDUCATION TOOL SYSTEMS AND METHODS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Children may grow up with little financial awareness, particularly as it relates to monetary saving habits. That is, it may be difficult for children to understand why favorable saving habits and fiscal responsibility are important to long term financial stability. Moreover, children may often be unaware of the costs of purchasing items, such as toys, electronics, etc., and how purchasing such items may affect the remaining monetary spending power available to the child. To assist children in effectively understanding the importance of saving money, the costs of purchasing certain items, and/or various other pillars of financial stability and financial independence, adults may provide verbal explanations of these concepts and how they fit into a family's overall budgeting plan. To better educate the children on the value of money, it may be desirable to provide a financial education tool to teach children about finance.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a financial education tool includes a body portion, a basin disposed within the body portion, and a receptacle into the body portion. The receptacle is configured to receive physical currency into the basin. The financial education tool also includes a counter configured to detect receipt of the physical currency into the basin, a display disposed on or integral with the body portion, and a user interface configured to receive a user input from a user of the financial education tool. The financial education tool includes at least one processor communicatively coupled to the display and the user interface. The at least one processor is configured to communicate with a server configured to manage a banking account of the user. The at least one processor is also configured to, in response to receiving the user input at the user interface, detecting receipt of the physical currency by the counter, or both, instruct the display to display information relating to the banking account of the user.

In one embodiment, a financial education tool includes a toy bank including a body housing a basin. The financial education tool includes a least one port extending through a portion of the body and configured to receive physical currency into the basin, expel the physical currency from the basin, or both. The financial education tool also includes one or more counters configured to monitor the physical currency received into the basin, ejected from the basin, or both. The financial education tool includes a display configured to display information relating to a banking account of a user, an amount of the physical currency in the basin, or both. The financial education tool also includes at least one processor communicatively coupled to the display, the one or more counters, and to a server configured to host the banking account, and includes a card charging system communicatively coupled to the at least one processor. The at least one processor is configured to operate the card charging system and communicate with the server to electronically transfer funds from the banking account to an account card, electronically transfer the funds from the account card to the banking account, or both, in response to a user input at a user interface of the financial education tool. The at least once processor is also configured to instruct the display to display an indication of a balance of the banking account in response to a transfer of the funds between the account card and the banking account.

In one embodiment, a system includes a server configured to host a banking account for a user and a financial education tool communicatively coupled to the server. The financial education tool includes a body portion, a basin within the body portion, and a receptacle through the body portion and configured to receive physical currency into the basin. The financial education tool also includes a counter configured to count the physical currency and provide currency value data based on counting the physical currency. The financial education tool includes a user interface coupled to the body portion and configured to receive a user input. The financial education tool also includes a processor housed within the body portion and communicatively coupled to a display of the financial education tool and the user interface. The processor is configured to instruct the display to display information relating to the banking account of the user in response to receiving the user input at the user interface and in response to the currency value data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a financial awareness tool that may help a user better understand the value of fiscal awareness and financial responsibility. The disclosed embodiments may be particularly helpful for children. Thus, to facilitate discussion, the disclosed embodiments are described with reference to children. However, it should be appreciated that the disclosed embodiments may be used for an adult or a person of any age. Additionally, to facilitate discussion, the terms "adult user" and "child user" may be utilized in certain examples. However, it should be appreciated that these terms may be interchangeable (e.g., inputs described as being provided by the adult user may be completed by the child user, and inputs described as being provided by the child user may be completed by the adult user). Moreover, discussion herein with respect to a "user" performing an action and/or providing an input may refer to the adult user, the child user, or both, performing the action and/or providing the input. As such, the term "user" may refer to either or both of the adult user and the child user throughout the present disclosure.

With the forgoing in mind, the disclosed financial awareness tool may include a user interface that is operable by the child user and configured to receive user input from the child user. As discussed in detail herein, in response to receiving the user input, the financial awareness tool may display or otherwise output information (e.g., visually, audibly) that is suitable for teaching the child user the value of favorable monetary saving habits, amongst other things. In some embodiments, the financial awareness tool may take on the form of a typical piggy bank, for example. That is, the financial awareness tool may have a physical shape or appearance that resembles a conventional children's piggy bank, which a child user may generally associate with an instrument for saving money. However, it should be appreciated that, in other embodiments, the financial awareness tool may include any other suitable shape or physical appearance that may not resemble a traditional piggy bank, for example. That is, the financial awareness tool make take on the shape or appearance of another animal (e.g., a giraffe) or character (e.g., a clown).

In some embodiments, the financial awareness tool may include a computing system (e.g., one or more processors and memory devices) that is configured to execute some of or all of the techniques discussed herein. The financial awareness tool may include one or more input devices (e.g., microphones, cameras, buttons, touch screen displays, other user interface devices) and one or more output devices (e.g., speakers, displays, animatronic features) that are communicatively coupled to the computing system. As discussed in detail herein, the input devices may be configured to receive an input from the child user to cause the computing device to perform an action and/or to provide a desired output. The output devices may provide an audio, visual, animatronic, and/or other output to the child user in response to certain input provided by the child user and/or in response to feedback received from another component or processing system of the financial awareness tool. One or more of the input devices and/or the output devices may collectively form a portion of the user interface of the financial awareness tool.

In some embodiments, the computing system may be electronically linked to a banking account associated with the child user. For example, the adult user may have previously generated a banking account for the child user (e.g., via a banking interface or other financial service portal subscribed to by the adult user) that may be hosted by a server (e.g., a server remote from the financial awareness tool). The adult user may associate or otherwise link the banking account with the computing system, such that the computing system may retrieve data relating to the banking account and/or adjust aspects relating to the banking account (e.g., initiate deposits or withdrawals from the banking account). As discussed in detail herein, the child user may utilize the financial awareness tool to perform certain permitted actions associated with the banking account of the child. For example, the child user may utilize the financial awareness tool to view a current balance of the banking account (e.g., a checking balance, a savings balance), to deposit money to the banking account, to withdraw money from the banking account, to track a savings rate of the child, to view pending deposits sent to the child's banking account, amongst various other functionalities. The child user may interact with the financial awareness tool via the input devices of the financial awareness tool. As such, the techniques discussed herein may be used to improve a child's financial education by enhancing the child's understanding of how to save money (e.g., for an item the child would like to purchase), how to withdraw currency from and/or deposit currency into a banking account, and/or how to transfer money between various banking accounts and/or financial platforms, for example. In some embodiments, the adult user may be configured to monitor the child user's actions and activity performed on the financial awareness tool via an electronic device (e.g., a mobile device) of the adult user's, which may be communicatively coupled to the computing system. These and other features will be described in detail below with reference to the drawings.

Figure 1:
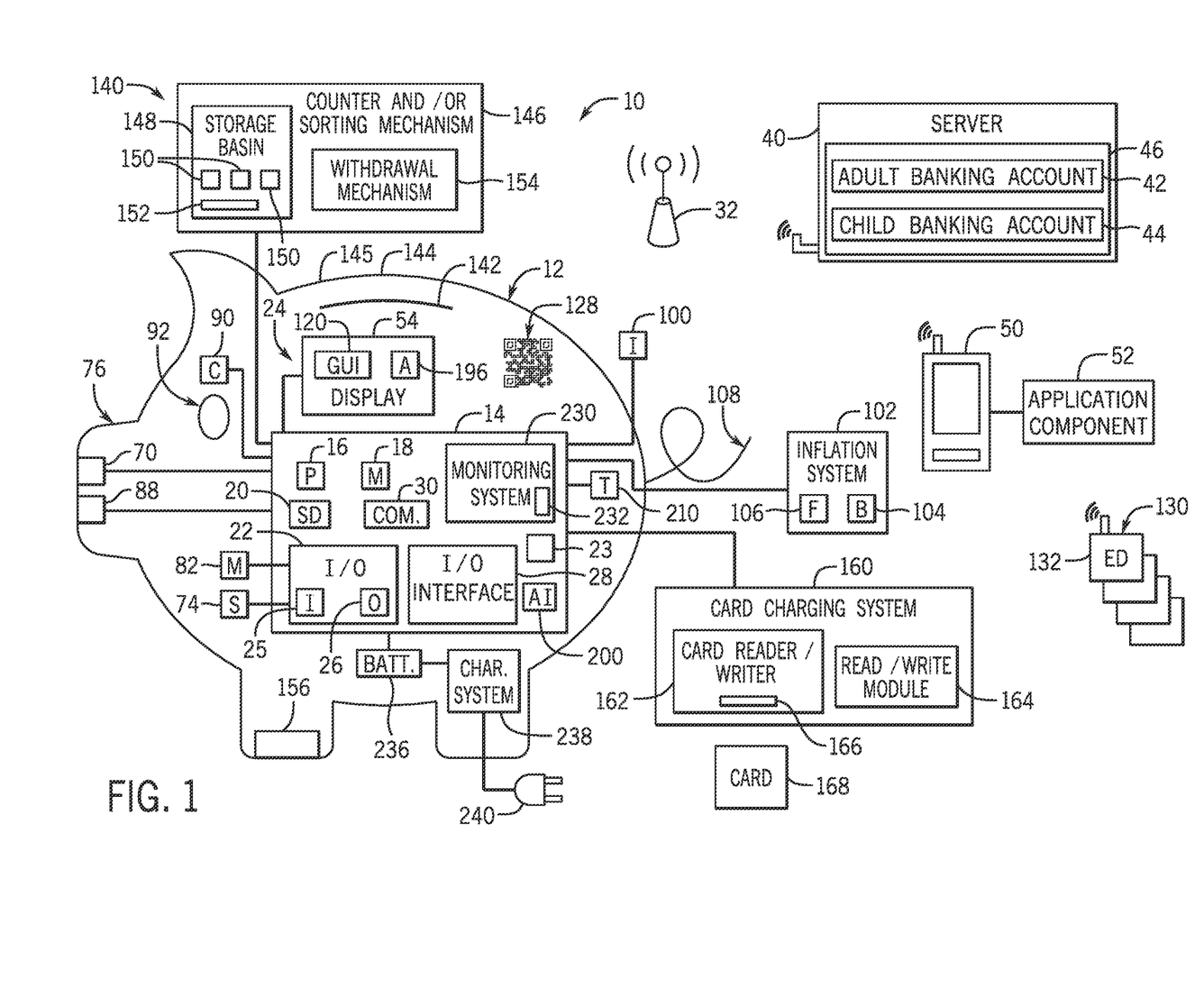
FIG. 1 depicts a schematic of an embodiment of a financial education system, in accordance with embodiments described herein.

With the forgoing in mind, FIG. 1 is a schematic of an embodiment of a financial education system 10 having a financial awareness tool 12 (e.g., an electronic banking device, a toy bank), also referred to herein as a financial education tool. In the illustrated embodiment, the financial awareness tool 12 includes a computing system 14 (e.g., a controller) that may be used for any of the operations described with respect to the various implementations discussed herein. The computing system 14 may include a processor 16 (or a plurality of processors 16), a memory device 18 (or a plurality of memory devices 18), one or more storage devices 20, and one or more input/output (I/O) devices 22. These various components (16, 18, 20, and 22) may be interconnected through at least one system bus 23 (e.g., a wired or wireless communication interface), which may enable the transfer of data between the various modules and components of the computing system 14. As discussed below, the I/O devices 22 may form at least a portion of a user interface 24 of the financial awareness tool 12.

The processor 16 may be configured to process instructions for execution within the computing system 14. The processor 16 may include single-threaded processor(s), multi-threaded processor(s), or both. The processor 16 may be configured to process instructions stored in the one or more memory device 18 and/or on the one or more storage devices 20. The processor 16 may include hardware-based processor(s) each including one or more cores. The processor 16 may include general purpose processor(s), special purpose processor(s), or both.

The memory device 18 may store information within the computing system 14. In some implementations, the memory device 18 include one or more computer-readable media. The memory device 18 may include any number of volatile memory units, any number of non-volatile memory units, or both volatile and non-volatile memory units. The memory device 18 may include read-only memory, random access memory, or both. In some examples, the memory device 18 may be employed as active or physical memory by one or more executing software modules.

The one or more storage devices 20 may be configured to provide (e.g., persistent) mass storage for the computing system 14. In some implementations, the one or more storage devices 20 may include one or more computer-readable media. For example, the one or more storage devices 20 may include a hard disk device, an optical disk device, or a tape device. The one or more storage devices 20 may include read-only memory, random access memory, or both. The one or more storage devices 20 may include one or more of an internal hard drive, an external hard drive, or a removable drive.

One or both of the one or more memory device 18 and/or the one or more storage devices 20 may include one or more computer-readable storage media (CRSM). The CRSM may include one or more of an electronic storage medium, a magnetic storage medium, an optical storage medium, a magneto-optical storage medium, a quantum storage medium, and so forth. The CRSM may provide storage of computer-readable instructions describing data structures, processes, applications, programs, other modules, or other data for the operation of the computing system 14 and/or of the financial education system 10. In some implementations, the CRSM may include a data store that provides storage of computer-readable instructions or other information in a non-transitory format. The CRSM may be incorporated into the computing system 14 or may be external with respect to the computing system 14. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor 16 and/or the memory device 18 may be supplemented by, or incorporated into, one or more application-specific integrated circuits (ASICs).

The one or more I/O devices 22 may enable the user to provide a user input to the computing system 14. For example, the one or more I/O devices 22 may include one or more input devices 25 such as a keyboard, a mouse, a pen, a game controller, a touch input device, an audio input device (e.g., a microphone), a gestural input device, a haptic input device, an image or video capture device (e.g., a camera), or other devices. The one or more I/O devices 22 may also include one or more output devices 26 such as a display, one or more light emitting diodes [LEDs], an audio output device (e.g., a speaker), a printer, a haptic output device, and so forth. The one or more I/O devices 22 may be physically incorporated with the computing system 14 or may be external with respect to the computing system 14.

In some embodiments, the computing system 14 may include one or more I/O interfaces 28 that enable components or modules of the computing system 14 to control, interface with, or otherwise communicate with the one or more I/O devices 22. The I/O interfaces 28 may enable information to be transferred in or out of the computing system 14, or between components of the computing system 14, through serial communication, parallel communication, or other types of communication. For example, the I/O interfaces 28 may be configured to provide a connection over Universal Serial Bus (USB) or Ethernet.

As discussed in detail herein, the I/O interfaces 28 may also include one or more communication components 30 (e.g., network interfaces) that enable communications between computing devices in the computing system 14 and/or between the computing system 14 and other network-connected computing systems communicating via a network 32 of the financial education system 10. The network interface(s) may include one or more network interface controllers (NICs) or other types of transceiver devices configured to send and receive communications over one or more networks using any network protocol.

For example, as discussed herein, the communication components 30 may enable the computing system 14 to communicate with one or more servers 40 (e.g., remote servers, servers of a banking provider). The one or more servers 40 may be configured to support, host, or otherwise provide, for example, tools that enable the adult user to create, maintain, and/or operate one or more banking accounts. As an example, in some embodiments, the one or more servers 40 may host an adult banking account 42 (e.g., savings account, checking account) of the adult user. Further, the one or more servers 40 may host a child banking account 44 (e.g., savings account, checking account) that may be linked to the adult banking account 42. The adult banking account 42 and/or the child banking account 44 may be hosted on a cloud network 46 that may be generated and/or maintained by the one or more servers 40. In some embodiments, the adult user may utilize one or more input devices, such as an electronic device 50 (e.g., an external source), to access the cloud network 46 to create, maintain, and/or monitor the adult banking account 42 and/or the child banking account 44. For example, the adult user may utilize an application component 52 installed on the electronic device 50 to control deposits, withdrawals, and/or transfers of funds between the adult banking account 42 and the child banking account 44. It should be appreciated that the electronic device 50 may include a cellular phone or other mobile device, a desktop computer, a tablet, or another computing device suitable for performing the actions of the electronic device 50 discussed herein.

The one or more servers 40, the electronic device 50, and/or or the computing system 14 may be communicatively coupled to one another via the network 32. The network 32 may include public networks such as the internet, private networks such as an institutional or personal intranet, or any combination of private and public networks. The network 32 may include any type of wired or wireless network, including, but not limited to, local area networks (LANs), wide area networks (WANs), wireless WANs (WWANs), wireless LANs (WLANs), mobile communications networks (e.g., 3G, 4G, Edge), and so forth. In some implementations, the communications between computing devices of the financial education system 10 may be encrypted or otherwise secured. It should be appreciated that the one or more servers 40 may be a component of the financial education system 10 and/or may be external to the financial education system 10.

In some embodiments, the one or more input devices 25 may include a display 54 (e.g., a touch screen display), which may form at least a portion of the user interface 24. As discussed below, the display 54 may be configured to display interactive or non-interactive graphics, icons, or other visual information to facilitate operation of the financial awareness tool 12 in accordance with the techniques discussed herein.

Figure 2:
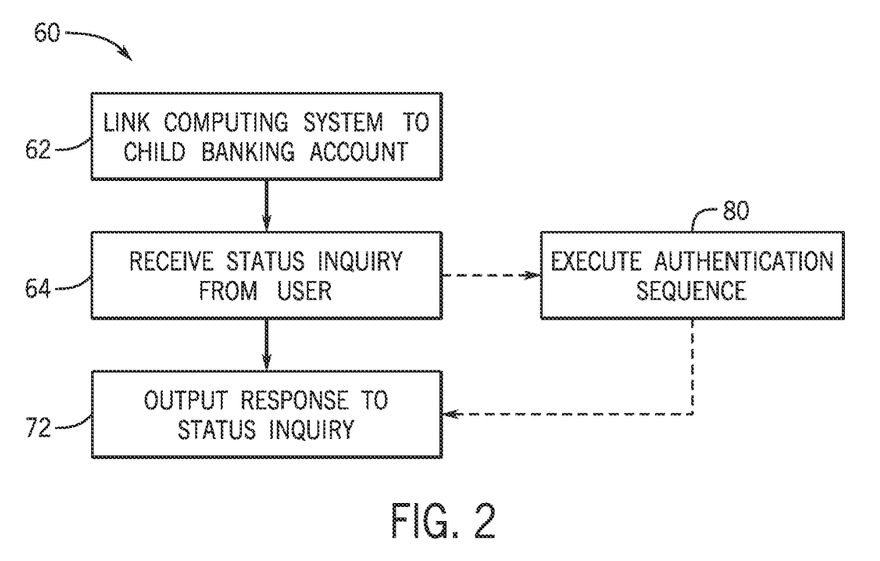
FIG. 2 depicts a flow diagram of an embodiment of a process for operating a financial education system, in accordance with embodiments described herein.

FIG. 2 is flow diagram of an embodiment of a process 60 for operating the financial education system 10. In particular, the process 60 may facilitate providing financial education to a child user of the financial education system 10. Portions of or all of the process 60 may be performed by one or more of the computing system 14, the one or more servers 40, the electronic device 50 (e.g., processing components of the electronic device 50), and/or other suitable processing circuitry. FIGS. 1 and 2 will be discussed concurrently below.

The process 60 includes linking the computing system 14 to the child banking account 44, as indicated by block 62. For example, in some embodiments, the electronic device 50 and/or the application component 52 may form at least a portion of the financial education system 10. In order to link the computing system 14 to the child banking account 44, the application component 52 may generate a user interface that prompts the adult user to input identifying information (e.g., a serial code) of the financial awareness tool 12, such that the server 40 and/or the computing system 14 may associate the child banking account 44 with the financial awareness tool 12. Additionally or alternatively, the user interface 24 of the financial awareness tool 12 may prompt the adult user to input identifying information (e.g., bank account number, routing number, authentication passwords) into the computing system 14 to prompt the computing system 14 to establish a connection between the server 40 and/or the electronic device 50. In any case, upon entry of the identifying information, the computing system 14 may link with and have access to the child banking account 44. That is, upon linking of the computing system 14 with the child banking account 44, the computing system 14 may retrieve data from the child banking account 44 such as, for example, a balance of funds (e.g., currency) on the child banking account 44 (e.g., in a checking and/or savings account), pending withdrawals that are expected to occur on the child banking account 44, pending deposits that are expected to occur on the child banking account 44, and so forth. Moreover, as discussed below, the computing system 14 may be configured to initiate actions on the child banking account 44 (e.g., initiate withdrawals, initiate deposits) upon linking of the computing system 14 with the child banking account 44.

In other embodiments, the computing system 14 may not be linked to a bank account (e.g., the child banking account 44) that may be hosted remotely (e.g., by the servers 40). Instead, the user interface 24 may enable the adult user to generate the child banking account 44 locally on the computing system 14, such that the child banking account 44 is stored on and hosted by the computing system 14. In such embodiments, the computing system 14 may not be communicatively coupled to the one or more servers 40 and/or to the electronic device 50, for example. Periodic linking may occur but, for example, may be done via a direct physical link.

Upon creation of the child banking account 44 and/or linking of the child banking account 44 to the computing system 14, the computing system 14 may receive a status inquiry (e.g., via the user interface 24, from the child user) indicative of a request for information regarding the child banking account 44, as indicated by block 64. For example, in some embodiments, the user interface 24 may include an input device 70 (e.g., a button, a knob, a dial, a touch sensor) that is communicatively coupled to the computing system 14. The input device 70 may be configured to generate an input signal in response to being pressed, turned, touched, or otherwise actuated by the child user. The computing system 14 may be configured to determine a desired type of status inquiry of the child user based on the input signal received from the input device 70. For example, in some embodiments, the child user may press the input device 70 (e.g., in embodiments where the input device 70 is a button) multiple times in a predetermined time period (e.g., less than two seconds) or engage (e.g., touch, press) the input device 70 for a predetermined time interval (e.g., 1 second, 2 seconds, 3 seconds, 4 seconds, etc.) to toggle between particular status inquires such as, for example, a request to display a current balance of the child banking account 44, a request for viewing pending withdrawals to occur on the child banking account 44, a request for viewing pending deposits to occur on the child banking account 44, amongst other information. The various status inquiries that are available for selection to the child user may be displayed on the display 54. In response to receiving the input signal from the input device 70 indicative of selection of a particular status inquiry, the computing system 14 may output a response to the status inquiry, as indicated by block 72.

In some embodiments, the response output by the computing system 14 based on the selected status inquiry may include an audible message that is output to the child user via a speaker 74 (e.g., one of the output devices 26). For example, the computing system 14 may instruct the speaker 74 to output an audio message indicating the current balance of funds in the child banking account 44 in response to a status inquiry requesting information regarding a current balance of funds in the child banking account 44. Additionally or alternatively, the computing system 14 may display (e.g., numerically or as a graphic, such as a growing cartoon pig) the current balance of funds on the display 54 in response to receiving the status inquiry. As such, the child user may periodically check the balance of the child banking account 44 by selectively pressing the input device 70 and/or by interacting with another suitable one of the input devices 25. In embodiments where a body portion of the financial awareness tool 12 is shaped as a traditional piggy bank, the input device 70 may be located on a nose 76 or snout of the piggy bank, for example. This may make activation (e.g., via contacting the nose 76) more interacting and exciting for children. In other embodiments, the input device 70 may be located near any other suitable portion of the financial awareness tool 12. It should be appreciated that, in certain embodiments, a body portion of the financial awareness tool 12 make take on the shape or appearance of another animal (e.g., a giraffe) or character (e.g., a clown) that may be of interest to children. In such embodiments, the input device 70 may be integrated with another suitable region of the animal or character (e.g., the input device 70 may be located on a hand of a clown-based character).

As indicated by block 80, in some embodiments, the computing system 14 may, in response to receiving the status inquiry at the block 64, request that the child user execute an authentication sequence, prior to the computing system 14 outputting the response to the status inquiry. As a non-limiting example, the computing system 14 may display a written message (e.g., via the display 54) or emit an audible message (e.g., via the speaker 74) requesting that the child user enter a password or a personal identification number (PIN) via one of the input devices 25. For example, the computing system 14 may prompt the child user to enter the password or PIN via a keyboard interface or other graphical user interface displayed on the display 54.

Additionally or alternatively, the computing system 14 prompt the child user to audibly recite the password or PIN to complete the authentication sequence. In such embodiments, the computing system 14 may receive the audible input from the child user via a microphone 82 (e.g., one of the input devices 25) and analyze the audible input to determine whether the password or PIN is the correct password or PIN corresponding to the child banking account 44. The correct password or PIN associated with the child banking account 44 may be stored on the memory device 18 and/or the one or more storage devices 20. The correct password or PIN associated the child banking account 44 may be previously entered into the computing system 14 by the child user and/or the adult user during an initial set-up phase of the financial awareness tool 12, such as during execution of the block 62 of the process 60.

In some embodiments, the computing system 14 may be linked to one or more other banking resources, such as one or more online portals (e.g., online banking services), currency exchanges (e.g., cryptocurrency exchanges, stock exchanges), rewards programs, or the like. The computing system 14 may enable a user to utilize the financial awareness tool 12 to access any one or combination of the banking resources without having to individually authenticate themselves with each of the banking resources during a particular sign-on to the banking resources. For example, in certain embodiments, the computing system 14 may be communicatively coupled to the internet or to another communication network (e.g., the network 32) via the communication components 30. As such, the computing system 14 may communicate with the banking resources via the communication components 30, for example. The user may utilize the user interface 24 (e.g., a graphical user interface displayed on the display 54) to navigate to each of the banking resources and, during a first sign-on with the banking resources, provide appropriate authentication credentials (e.g., username, password) to log into the banking resources. The computing system 14 may be configured to, upon requesting and receiving user approval via the user interface 24, save the authentication credentials for each of the banking resources on the memory device 18 and/or the one or more storage devices 20. As such, the computing system 14 may enable the user to subsequently access the banking resources without having to re-enter the authentication credentials each time the user wishes to access the banking resources. For example, when the user initiates a new interaction session with the financial awareness tool 12, the computing system 14 may first prompt the user to execute the authentication sequence discussed above prior to providing access to the functionality of the financial awareness tool 12. Upon determining successful execution of the authentication sequence, the computing system 14 may enable the user to navigate (e.g., via the user interface 24) to any one of the banking resources linked to the computing system 14. To this end, because the authentication credentials for the banking resources may already be previously stored on the memory device 18 and/or the one or more storage devices 20, the user may obtain access to the banking resources without having to re-authenticate themselves with the banking resources. That is, the computing system 14 may automatically enter the authentication credentials for a particular banking resource the user is attempting to access and/or may transmit another confirmation message to the banking interface that is suitable to provide authentication of the user to the banking interface. In accordance with the aforementioned techniques, the financial awareness tool 12 may teach children the benefits of utilizing a password manager, for example, to store and/or organize authentication credentials for a plurality of different service resources.

In certain embodiments, the financial awareness tool 12 may include a fingerprint sensor 88 (e.g., one of the input devices 25) and/or a camera 90 (e.g., one of the input devices 25) that are configured to facilitate execution of the authentication sequence. Particularly, in such embodiments, at the block 80, the computing system 14 may prompt the child user to press the fingerprint sensor 88 and/or to look into the camera 90 to authenticate themselves. For example, the computing system 14 may store biometric information (e.g., fingerprint information, facial features or structures) that is associated with the child user and has been previously input into the computing system 14 (e.g., during an initial set-up phase of the financial awareness tool 12). As such, the computing system 14 may utilize feedback from the fingerprint sensor 88 and/or from the camera 90 to analyze the received biometric information of the child user and to determine whether the child user is the correct user associated with the child banking account 44. That is, the computing system 14 may determine whether the biometric data received via the fingerprint sensor 88 and/or via the camera 90 matches (e.g., is within a threshold degree of error) the biometric information stored on the computing system 14 and associated with the child user (e.g., stored on the memory device 18 and/or the storage devices 20). Upon determining that the received biometric data matches the biometric information associated with the child user, the computing system 14 may proceed to the block 72. That is, the computing system 14 may output the response to the status inquiry at the block 72 upon successful execution of the authentication sequence.

In some embodiments, upon successful execution of the authentication sequence at the block 80, the computing system 14 may output an audible message (e.g., via the speaker 74), such as "authentication successful" or "I recognize you" to inform the child user that they have successfully authenticated their identify with the financial awareness tool 12. As such, the financial awareness tool 12 may facilitate teaching the child user the importance of authentication protocols used to interact with modern day banking systems. In embodiments where the financial awareness tool 12 is shaped as a traditional piggy bank, the fingerprint sensor 88 may be located on the nose 76 or snout of the piggy bank and the camera 90 may be located in or form a portion of an eye 92 of the financial awareness tool 12. In other embodiments, the fingerprint sensor 88 and/or the camera 90 may be located along any other suitable portion of the financial awareness tool 12. Indeed, in an embodiment, the camera 90 may be integrated into the eyes 92 of the financial awareness tool 12 and the financial awareness tool 12 may emit audible instructions (e.g., via the speaker 74) instructing the user to gaze into the eyes 92 to authenticate themselves (e.g., via acquisition and comparison of biometric data of the user, in accordance with the aforementioned techniques). Such authentication methods may be particularly entertaining for children utilizing the financial awareness tool 12.

The following discussion continues with reference to FIG. 1. In some embodiments, the application component 52 of the financial education system 10 may enable a user (e.g., the adult user) to configure certain aspects of the financial awareness tool 12. For example, in some embodiments, the application component 52 may prompt the user to set a target savings goal (e.g., a target savings indicator) for the child banking account 44. The electronic device 50 may transmit the target savings goal to the financial awareness tool 12, and the financial awareness tool 12 may be configured to display the target savings goal (e.g., via the display 54) to the child user. In some embodiments, the financial awareness tool 12 may include one or more indicators 100 (e.g., light emitting diodes [LEDS]) that are configured to emit various colors of light based on the amount of funds in the child banking account 44 relative to the target savings goal set by the adult user. For example, in some embodiments, the computing system 14 may instruct one or more of the indicators 100 to illuminate in a first color (e.g., green) while an actual balance (e.g., a real-time monetary balance) of the child banking account 44 is within a threshold percentage of the target savings goal and may instruct the one or more indicators 100 to illuminate a second color (e.g., red) while the actual balance of the child banking account 44 is below of a threshold percentage of the target savings goal. Additionally or alternatively, the computing system 14 may adjust a quantity of the indicators 100 that are illuminated based on the amount of funds in the child banking account 44 relative to the target savings goal set by the adult user. For example, the computing system 14 may gradually increase a quantity of the indicators 100 that are illuminated in response to an actual balance (e.g., a real-time monetary balance) of the child banking account 44 approaching the target savings goal.

In some embodiments, the indicators 100 may configured to alert the child user when a deposit is made to the child banking account 44. For example, in certain embodiments, the adult user may utilize the electronic device 50 to electronically deposit funds to the child banking account 44. Additionally or alternatively, other users (e.g., relatives, other persons) may electronically transfer funds to the child banking account 44 (e.g., via respective mobile devices of the other users). Upon receiving an indication (e.g., from the one or more servers 40) that a deposit has been made to the child banking account 44, the computing system 14 may instruct the indicator 100 to illuminate a designed color (e.g., green) or to flash intermittently, for example. Additionally or alternatively, the computing system 14 may instruct the speaker 74 to output audio (e.g., a verbal message) to indicate that a deposit has been made to the child banking account 44. In some embodiments, the computing system 14 may be configured to display the amount deposited (e.g., via the display 54) and/or to output an audio message of the amount deposited (e.g., via the speaker 74) upon receiving input from the child user, such as input received in response to the child user pressing the input device 70. In certain embodiments, the computing system 14 may display or otherwise output an indication of the amount of funds deposited to the child banking account 44 after the child successfully executes the authentication sequence discussed above.

In certain embodiments, the financial awareness tool 12 may include and employ a variety of other visual indicators to provide feedback indicative of monetary transactions occurring on and/or through the computing system 14. For example, the financial awareness tool 12 may include an inflation system 102 having a bladder 104 (e.g., an inflatable bag, a balloon) and a fan 106 (e.g., a blower or other air moving device), where the inflation system 102 may provide visual feedback to a user. At least a portion of the inflation system 102 may be coupled to and/or disposed within a body portion of the financial awareness tool 12. The fan 106 may be communicatively coupled to the computing system 14 and configured to receive instructions from the computing system 14 to selectively inflate or deflate the bladder 104 based on transaction information. For example, upon receiving an indication (e.g., from the server 40) that a deposit has been made to the child banking account 44, the computing system 14 may instruct the fan 106 to temporarily inflate the bladder 104 (e.g., for a predetermined time period, such as one hour) to provide a visual indication to the child user that a deposit has been made to the child user's banking account. If the bladder 104 is currently inflated, in response to the child user initiating a withdrawal from the child banking account 44 in accordance with the presently disclosed techniques, the computing system 14 may instruct the fan 106 to deflate the bladder 104. In some embodiments, the computing system 14 may instruct the fan 106 to adjust inflation of the bladder 104 based on the amount of funds in the child banking account 44 relative to the target savings goal for the child user set forth above. For example, the computing system 14 may gradually increase a percentage of inflation of the bladder 104 (e.g., in 5 percent increments) in response to an actual balance (e.g., a real-time monetary balance) of the child banking account 44 approaching the target savings goal. In embodiments where a body portion of the financial awareness tool 12 is shaped as a traditional piggy bank, the bladder 104 may be located on and/or form, for example, a tail 108 of the piggy bank. As such, the computing system 14 may operate the inflation system 102 to inflate or deflate the tail 108 based on monetary transactions occurring on the financial awareness tool 12, based on a monetary balance of the child banking account 44, and/or based on another suitable parameter.

In some embodiments, the computing system 14 may push usage information regarding the child user's usage of the financial awareness tool 12 to the electronic device 50. In this way, the adult user may monitor the child user's usage of the financial awareness tool 12 via the application component 52, for example. As a non-limiting example, the usage information may include deposits to and/or withdrawals form the child banking account 44 that may be initiated by the child user via operation of the financial awareness tool 12.

Figure 3:
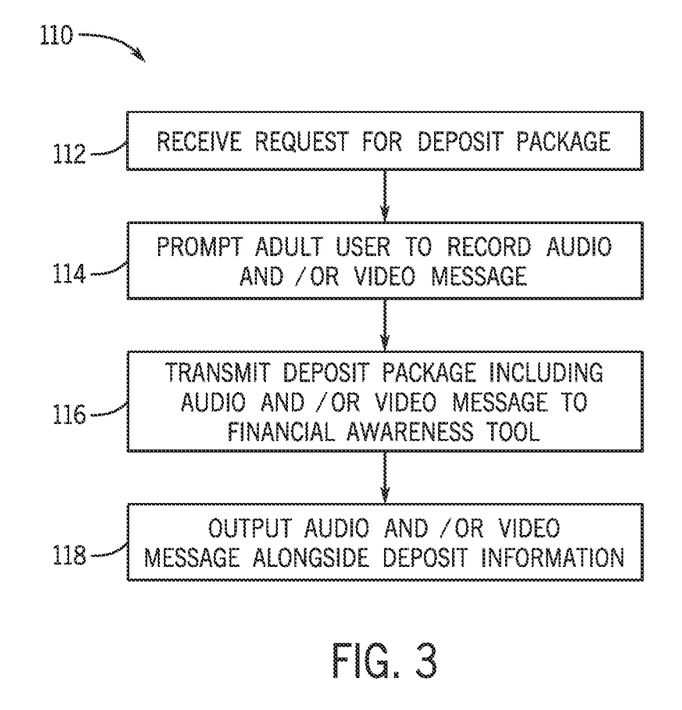
FIG. 3 depicts a flow diagram of an embodiment of a process for operating a financial education system, in accordance with embodiments described herein.

In some embodiments, the financial education system 10 may enable the person or persons making the deposit to the child banking account 44 to record an audio message and/or a video message that is to be presented to the child user when the child user interacts with the financial awareness tool 12 to check the deposit made to the child bank account 44 (e.g., such as when the child user presses the input device 70). For example, FIG. 3 is a flow chart of an embodiment of a process 110 for creating a deposit package via, for example, the electronic device 50. As discussed below, the deposit package may include an audio message and/or video message generated by a user, as well as an indication of a deposit amount to be made to the child banking account 44. It should be appreciated that, in certain embodiments, some of or all of the steps of the process 110 may be performed on and/or using the financial awareness tool 12 and/or the one or more servers 40, in addition to, or in lieu of, the electronic device 50.

The process 110 includes receiving (e.g., at the electronic device 50) a request for creating a deposit package, as indicated by block 112. For example, the adult user or another suitable user may utilize the application component 52 (e.g., which may execute on the electronic device 50) to initiate a deposit of monetary funds to the child banking account 44. The application component 52 may prompt the adult user to record an audio message and/or a video message that is to be associated with the deposit to the child banking account 44, as indicated by block 114. The adult user may choose to decline the request for recording the message or may choose to record an audio and/or video message. If the adult user decides to record an audio and/or video message (e.g., via a microphone and/or camera of the electronic device 50), the electronic device 50 may transmit the audio and/or video message to a processing component of the financial education system 10, such as the computing system 14, as indicated by block 116. That is, the electronic device 50 may transmit the deposit package including the recorded message (e.g., audio and/or video) and an indication of the amount of funds to be deposited to the child banking account 44 to the computing system 14. As such, the computing system 14 may store the audio message and/or the video message on the memory device 18 and/or the storage devices 20. As indicated by block 118, the computing system 14 may be configured to output the audio and/or video message in response to the child user, for example, pressing the input device 70 to inquire about the deposit made to the child banking account 44. In some embodiments, the computing system 14 may provide information regarding pending or completed deposits each time the child user presses the input device 70. In other embodiments, the child user may view information regarding pending or completed deposits, account balances, and/other information by interacting with a graphical user interface (GUI) 120 provided on the display 54 and/or via another suitable input device of the financial awareness tool 12.

The following discussion continues with reference to FIG. 1. In some embodiments, the computing system 14 may be configured to link the child banking account 44 to a code 128 (e.g., a quick response [QR] code, a bar code) that may be printed, inscribed, or displayed on the financial awareness tool 12 (e.g., on an exterior surface or screen of the financial awareness tool 12). The code may be scannable by the electronic device 50 or by other electronic devices 130 of other users to enable users of the electronic devices 50, 130 to identify the child banking account 44 and transfer monetary funds to the child banking account 44. For example, a user of one of the other electronic devices 130, referred to hereinafter as an additional electronic device 132, may, upon installation of the application component 52 on the additional electronic device 132, scan the code 128 (e.g., via a camera of the additional electronic device 132) to identify the child banking account 44 and establish a communication link between the child banking account 44 and the additional electronic device 132. That is, the application component 52 may, upon identification of the code 128, enable the additional electronic device 132 to communicate with the server 40 to transfer funds to the child banking account 44. As such, the user of the additional electronic device 132 may utilize the application component 52 to transfer funds from a bank account of the user or from another other source of the user to the child banking account 44.

In some embodiments, the financial awareness tool 12 may include a physical currency storage system 140 that is configured to receive and store physical currency (e.g., paper bills, coins, checks) within a cavity or basin. Some of or all of the components of the physical currency storage system 140 may be coupled to, disposed within, and/or formed within a body portion of the financial awareness tool 12. For example, the physical currency storage system 140 may include a receiving opening 142 (e.g., an aperture, a slot, a receptacle, a port) that is formed in a surface 144 of a body portion 145 of the financial awareness tool 12 and configured to receive physical currency. The physical currency storage system 140 may include counter and/or sorting mechanism 146 (e.g., a counter that operates based on optical sensor and optical recognition applications) that is configured to determine whether the physically currency is a paper bill, a coin, or a check, for example. Moreover, the counter and/or sorting mechanism may be communicatively coupled to the computing system 14 and configured to provide the computing system 14 with feedback (e.g., currency value data) indicative of a quantity of currency that has been inserted into the financial awareness tool 12 (e.g., via the receiving opening 142).

For example, the counter and/or sorting mechanism 146 may be configured to identify a monetary value of paper bills, coins, and/or checks inserted into the receiving opening 142 and to provide an indication of the monetary value to the computing system 14. In some embodiments, the counter and/or sorting mechanism 146 may include a camera, scanner, and/or other suitable device configured to scan checks inserted into the receiving opening 142 and to send an image of the checks to the computing system 14. The computing system 14 may be configured to analyze the image to determine an amount of currency to be deposited with the check. In other embodiments, the counter and/or sorting mechanism 146 may include local processing components configured to analyze the image and to provide an indication to the computing system 14 indicative of an amount of currency deposited via the receiving opening 142 (e.g., in the form of a check). In any case, the computing system 14 may, in response to determining that physical currency has been inserted into the receiving opening 142, instruct the server 40 to update the balance of the child banking account 44 to reflect the quantity of currency inserted into the receiving opening 142 (e.g., in the form of paper bills, coins, and/or checks). In some embodiments, the computing system 14 may instruct the display to display an amount of the physical currency input via the receiving opening 142 in response to feedback received from the counter and/or sorting mechanism 146.

In some embodiments, the physical currency storage system 140 may include a basin 148 (e.g., a storage basin) configured to store the physical currency that may be received via the receiving opening 142 (e.g., the receptacle extending into the body portion 145). The basin 148 may be disposed within an interior of the body portion 145. In some embodiments, the counter and/or sorting mechanism 146 may separate paper bills, coins, and/or checks from one another and direct the paper bills, coins, and/or checks into dedicated storage receptacles 150 within the basin 148. In certain embodiments, based on feedback (e.g., currency value data) received from the physical currency storage system 140 (e.g., from a processing component of the physical currency storage system 140), the computing system 14 may instruct the display 54 to continuously and/or periodically display an amount of physical currency within the basin 148 and/or within each of the storage receptacles 150. In some embodiments, the financial awareness tool 12 may include an access panel 152 that enables a user to periodically access the basin 148 to remove physical currency that may be accumulated within the basin 148. The access panel 152 may, in some embodiments, form at least a portion of the surface 144 of the financial awareness tool 12.

In some embodiments, the financial awareness tool 12 may include a physical currency withdrawal mechanism 154 (e.g., a dispenser) that is configured to selectively discharge physical currency from the basin 148 based on user input received at one or more of the input devices 25. For example, in some embodiments, the computing system 14 is configured to display (e.g., via the display 54) or otherwise output a prompt requesting whether the child user would like to withdraw funds from the child banking account 44 (e.g., in response to user input received at the input device 70, for example). Particularly, the display 54 may include a touch screen display that renders the graphical user interface 120 to enable the child user to specify an amount of currency the child user would like to withdraw from the child banking account 44. In response to receiving the input indicative of the requested withdrawal amount from the child user (e.g., 5 dollars), the computing system 14 may instruct the physical currency withdrawal mechanism 154 to discharge the corresponding amount of physical currency from the basin 148 (e.g., via an output slot 156 or output port formed in the financial awareness tool 12). In some embodiments, the output slot 156 may include the receiving opening 142. That is, the physical currency storage system 140 may be configured to both receive physical currency via the receiving opening 142 or port and to output physical currency via the receiving opening 142 or port. The counter and/or sorting mechanism 146 may provide the computing system 14 with feedback indicative of a quantity of physical currency received into the basin 148 via the receiving opening 142 and/or a quantity of physical currency output (e.g., ejected) from the basin 148 via the output slot 156. Further, the computing system 14 may instruct one or more of the output devices 26 to output visual, audio, and/or haptic feedback to confirm occurrence of the transaction. Upon discharge of the physical currency from the output slot 156, the computing system 14 may update the balance of the child banking account 44 to reflect the withdrawal. That is, the computing system 14 may instruct the server 40 to update the balance of the child banking account 44 to reflect to quantity of currency dispensed via the output slot 156 (e.g., in the form of paper bills, coins, and/or checks). The computing system 14 may also instruct the display 54 to display information related to the withdrawal to the child user. As an example, the computing system 14 may instruct the display 54 to indicate a percentage of the total balance of the child banking account 44 that was output in the form of the withdrawal, such that the child user may gain an appreciation of the effect monetary withdrawals may have on the overall balance in the child user's banking account 44 over time.

For example, in some embodiments, in response to receiving the input indicative of the requested withdrawal amount from the child user (e.g., 5 dollars), the computing system 14 may instruct the physical currency withdrawal mechanism 154 to discharge (e.g., eject) the corresponding amount of physical currency from the basin 148 (e.g., via an output slot 156 or port formed in the financial awareness tool 12). The computing system 14 may instruct the server 40 to update a balance of the child banking account 44 to reflect the amount of currency withdrawn from the basin 148. Further, the computing system 14 may determine a percentage of a total savings balance of the child user that has been withdrawn (e.g., 10 percent of a total balance) from the child banking account 44 in response to the withdrawal request. Subsequently, the computing system 14 may provide an audio output and/or video output informing the child user to the withdrawal percentage. For example, the computing system 14 may instruct the speaker 74 to output an audio message such as "You have withdrawn ten percent of your savings balance," and/or may instruct the display 54 to display such a message or a similar message to the child user.

In some embodiments, the financial awareness tool 12 may be configured to facilitate teaching the child user how to use and implement, for example, gift cards, debit cards, loyalty cards, and/or credit cards. For example, as shown in the illustrated embodiment of FIG. 1, the financial awareness tool 12 may include a card charging system 160 that includes a card reader 162 (e.g., a reader/writer) and a reading module 164 (e.g., a reading/writing module). The reading module 164 may be communicatively coupled to the card reader 162 and the computing system 14. The card reader 162 may include a slot 166 configured to receive a card 168 (e.g., an account card, a magnetic strip card). The card 168 may represent or be indicative of gift cards, debit cards, loyalty cards, credit cards, and/or virtual cards that may be displayed on a electronic device (e.g., a cellular phone). Upon insertion of the card 168 into the slot 166 and/or swiping of the card 168 along the slot 166, the reading module 164 may read data from and/or write data to the card 168. As such, the card charging system 160 may facilitate increasing the child user's awareness of the operational principles of gift, debit, and/or credit cards.

Figure 4:
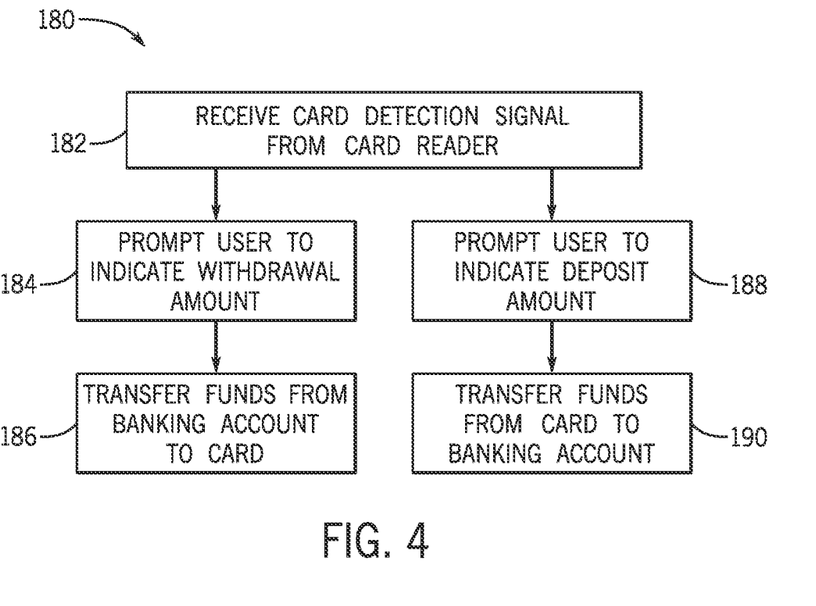
FIG. 4 depicts a flow diagram of an embodiment of a process for operating a financial education system, in accordance with embodiments described herein.

For example, FIG. 4 is an embodiment of a process 180 for operating the card charging system 160. FIGS. 1 and 4 will be discussed concurrently below. Portions of or all of the process 180 may be executed by the computing system 14 and/or another suitable processing system of the financial education system 10. In the illustrated embodiment, the process 180 includes receiving (e.g., at the computing system 14) a card detection signal from the card reader 162, as indicated by block 182. For example, the computing system 14 may receive the card detection signal from the reading module 164 in response to the child user inserting the card 168 into the slot 166 and/or swiping the card 168 along the slot 166. In response to receiving the card detection signal, the computing system 14 may prompt the child user to indicate a withdrawal amount (e.g., an amount of currency) that the child user desires to withdraw from the child banking account 44, as indicated by block 184. For example, in some embodiments, the computing system 14 may request (e.g., via the graphical user interface 120 displayed on the display 54) that the child user enter the amount of currency the child user would like to withdraw from the child banking account 44.

In response to receiving an indication of a desired currency withdrawal amount (e.g., based on inputs received at the graphical user interface 120), the computing system 14 may instruct the card reader 162 to transfer funds (e.g., digitally transfer) from the child banking account 44 to the card 168, as indicated by block 186. That is, the card reader 162 may be configured to write data to the card 168, such that the card 168 stores a record of the amount of funds transferred from the child banking account 44 to the card 168. Upon completion of the transfer of funds from the child banking account 44 to the card 168, the computing system 14 may provide a visual alert (e.g., via the display 54, via the indicator 100), an audible alert (e.g., via the speaker 74), or another suitable alert to the child user indicating that the transfer of funds from the child banking account 44 to the card 168 has been completed. The computing system 14 may instruct the server 40 to update the balance of the child banking account 44 based on the amount of funds transferred to the card 168. Further, upon completion of the withdrawal of funds from the child banking account 44, the computing system 14 may be configured to display a remaining balance of the child banking account 44 on the display 54. In some embodiments, the card 168 may be useable at retail stores or other pre-determined locations to enable the child user to purchase certain goods. As such, the card charging system 160 may facilitate increasing the child user's awareness of the functionality of gift, debit, and/or credit cards. In certain embodiments, in response to receiving a request to transfer funds from the child banking account 44 to the card 168, the computing system 14 may send a notification to the electronic device 50 indicating that a withdrawal is in process. The application component 52 may, in some embodiments, prompt the adult user to approve or deny the withdrawal prior to the computing system 14 transferring funds from the child banking account 44 to the card 168.

In some embodiments, the card charging system 160 may enable the child user to transfer (e.g., digitally transfer) funds from the card 168 to the child banking account 44. For example, in response to receiving the card detection signal, the computing system 14 may prompt the child user to indicate a deposit amount (e.g., an amount of currency) that the child user desires to deposit from the card 168 to child banking account 44, as indicated by block 188. The computing system 14 may perform block 188 concurrently to or alternatively to block 184. The computing system 14 may, via the graphical user interface 120, request that the child user enter the amount of currency the child user would like to deposit from the card 168 to the child banking account 44. In response to receiving an indication of a desired currency deposit amount (e.g., based on inputs received at the graphical user interface 120), the computing system 14 may instruct the card reader 162 to transfer funds (e.g., digitally transfer) from the card 168 to the child banking account 44, as indicated by block 190. Upon completion of the transfer of funds from the card 168 to the child banking account 44, the computing system 14 may provide a visual alert (e.g., via the display 54, via the indicator 100), an audible alert (e.g., via the speaker 74), or other suitable alert to the child user indicating that the transfer of funds from the card 168 to the child banking account 44 has been completed. The computing system 14 may be configured to display a remaining balance of the card 168 and/or and updated balance of the child banking account 44 on the display 54 upon completion of the deposit of funds from the card 168 to the child banking account 44.

In some embodiments, the computing system 14 may instruct the display 54 to output a graphical icon to visually illustrate the change in balance of the child banking account 44 to the user (e.g., in response to a withdrawal/deposit). For example, the graphical icon may include a character (e.g., an animal character) that matches a character shape (e.g., a pig) of the body portion 145 of the financial awareness tool 12. The computing system 14 may instruct the display 54 to adjust a size of the graphical icon based on the balance of the child banking account 44. That is, the computing system 14 may permanently or temporarily cause an increase in the size of the graphical icon, as displayed on the display 54, in response to a deposit made to the child banking account 44 in accordance with the techniques discussed herein. Conversely, the computing system 14 may permanently or temporarily cause a decrease in the size of the graphical icon, as displayed on the display 54, in response to a withdrawal made from the child banking account 44 in accordance with the techniques discussed herein.

In some embodiments, the computing system 14 may operate the physical currency storage system 140 and the card charging system 160 in unison to facilitate transfer of funds between the card 168 and the physical currency storage system 140. For example, the computing system 14 may be configured to instruct the card charging system 160 to deposit funds onto the card 168 in response to a deposit of physical currency into the receiving opening 142 and a user input (e.g., received at the user interface 24) requesting that funds be transferred to the card 168. Moreover, the computing system 14 may be configured to instruct the card charging system 160 to remove funds from the card 168 and to discharge physical currency from the basin 148 in response to an additional user input at the user interface 24 requesting a withdrawal of physical funds from the card 168. In some embodiments, the computing system 14 may be configured to instruct the card charging system 160 to deposit funds onto the card 168 based on a value of the physical currency in the basin 148 as determined by the counter and/or sorting mechanism 146. Thus, the computing system 14 may facilitate cash withdrawal and educate the child user on usage of an automated teller machine (ATM), for example. In some embodiments, these transactions may be stored on a ledger (e.g., a blockchain) to maintain appropriate balances on the child banking account 44. A blockchain (a chain of records stored in blocks that are managed by a distributed network of authorities) may be generated or updated to include the transaction information associated with the deposit and/or withdrawal of physical and/or virtual currency from the child banking account 44 and/or the physical currency storage system 140. The blockchain may be maintained across several computers that are linked (e.g., via a peer-to-peer network) so that the information is distributed and confirmable. Indeed, the blockchain provided in accordance with present embodiments may be defined as a data structure that holds transactional data (e.g., transactional data such as a date and/or time of a withdrawal of currency and/or a deposit of currency in accordance with any of the techniques discussed herein) in a manner that is accessible and immutable. Thus, the blockchain may serve as a secure, transparent, and decentralized repository of transaction information for the user(s) of the financial awareness tool 12.

The following discussion continues with reference to FIG. 1. In some embodiments, the computing system 14 may be configured to render an analytics interface 196 (e.g., an interactive graphical user interface) on the display 54 that is configured to display data relating to the child user's financial habits and current financial status. For example, the analytics interface 196 may include a plurality of icons (e.g., user-selectable icons) that, when selected by the user (e.g., via the touch screen interface of the display 54), may present various information related to the child user's financial status. For example, based on the selected icon of the plurality of icons, the computing system 14 may instruct the display 54 to display a current balance of the child banking account 44, pending deposits and/or withdrawals to be made on the child bank account, an average amount of funds withdrawn from and/or deposited to the child banking account 44 over a particular interval of time (e.g., daily, weekly, monthly, yearly), a graphical display of goods purchased via the card 168 (e.g., a pie chart depicting an allocation of funds used to purchase food, toys, or other services via the card 168), and/or other suitable information related to the child banking account 44. As such, the analytics interface may facilitate teaching the child user about the spending habits of the child user over time, for example.

In certain embodiments, the computing system 14 may include an artificial intelligence agent 200 that executes on, for example, the processor 16. The artificial intelligence agent 200 may be configured to provide audio, visual, and/or haptic responses in response to inquires provided by the child user to the artificial intelligence agent 200. For example, in some embodiments, the child user may activate the artificial intelligence agent 200 by pressing a particular button on the financial awareness tool 12 and/or by uttering a predetermined initiation phrase such as "Hey piggy bank." The computing system 14 may, in response to determining that the corresponding button has been pressed and/or receiving an indication from the microphone 82 that the predetermined initiation phrase has been uttered, instruct the artificial intelligence agent 200 to initiate a dialog with the child user. For example, upon activation, the artificial intelligence agent 200 may emit an audio phrase such as "What is your question?" and may listen (e.g., via feedback from the microphone 82) to the child user's reply. The artificial intelligence agent 200 may include voice recognition software that enables the artificial intelligence agent 200 to decipher the child user's reply, search for an appropriate answer to an inquiry that may be posed in the child user's reply, and output (e.g., via the speaker 74) an audio reply responding the child user's inquiry. As such, the child user may utilize the artificial intelligence agent 200 to inquire about aspects of the current financial status of the child user and/or to generally inquire about various financial and/or economic principles. To this end, the artificial intelligence agent 200 may improve the overall financial literacy of the child user.

In some embodiments, the financial awareness tool 12 may include a tracking sensor 210 (e.g., a tracking beacon, a global position sensor [GPS]) that is communicatively coupled to the computing system 14 and configured to provide the computing system 14 with feedback indicative of a location (e.g., a real-time location) of the financial awareness tool 12. The computing system 14 may be configured to provide data indicative of the position of the financial awareness tool 12 to the electronic device 50. As such, the adult user may view, monitor, and/or track a position of the financial awareness tool 12 based on feedback from the tracking sensor 210. In certain embodiments, the computing system 14 may be configured to push an alert to the electronic device 50 in response to receiving feedback from the tracking sensor 210 indicating that the financial awareness tool 12 has transitioned out of a designated area (e.g., using geo-fencing technology).

For example, in certain embodiments, the user may specify an acceptable target location or target area of the financial awareness tool 12 (e.g., via input provided through the input devices 25), which may subsequently be stored on the memory and/or storage devices 18, 20 of the computing system 14. The acceptable target location or target area may include, for example, a room or space within a building, an area within a threshold radius from a designated location, or another suitable region of space. The computing system 14 may, based on the feedback provided by the tracking sensor 210, continuously or intermittently determine whether the financial awareness tool 12 is within the acceptable target location or target area. In response to determining that the financial awareness tool 12 is not within the acceptable target location or target area, the computing system 14 may push the alarm to the electronic device 50 and/or initiate emittance of another alarm. For example, the computing system 14 may instruct the speaker 74 to emit an audible alarm in response to determining that the financial awareness tool 12 is not within the acceptable target location or target area.

In some embodiments, the financial awareness tool 12 may include a monitoring system 230 that is communicatively coupled to the computing system 14 and configured to detect unauthorized user attempts to retrieve physical currency from the physical currency storage system 140, for example. The monitoring system 230 may include a sensor 232 (e.g., a contact sensor) that is configured to detect user attempts to forcefully open the access panel 152 (e.g., without executing the authentication sequence set forth above). In response to receiving feedback from the sensor 232 that an unauthorized user is attempting to access the physical currency storage system 140, the computing system 14 may instruct the speaker 74 to output and audible alarm and/or transmit an alert message to the electronic device 50.

The financial awareness tool 12 may include a battery 236 (e.g., a battery module) that may supply electrical power for operating any one or combination of components of the financial awareness tool 12. The financial awareness tool 12 may include an electrical charging system 238 having a plug 240 suitable for electrically coupling the electrical charging system 238 to a grid power supply (e.g., a residential wall socket). The electrical charging system 238 may utilize power from the grid power supply to charge the battery 236 and/or to directly supply power to the various components of the financial awareness tool 12.

In some embodiments, the financial awareness tool 12 may operate as a night light during evening hours and/or conditions of limited visibility. For example, the user interface 24 may enable a user to instruct the computing system 14 to illuminate the indicator 100 or another lighting device of the financial awareness tool 12 during a designated time period of the day (e.g., between 8:00 μm and 6:00 am) to act as a night light. Moreover, the user interface may enable the user to instruct to computing system 14 to output particular audio outputs (e.g., soothing music) via the speaker 74 during the designated time period (e.g., between 8:00 μm and 6:00 am).

In some embodiments, the computing system 14 may be configured to communicatively couple to one or more cryptocurrency exchanges that may facilitate purchasing and/or selling cryptocurrencies and/or that may otherwise provide information relating to various cryptocurrencies. In certain embodiments, the user interface 24 may enable the child user to operate the financial awareness tool 12 to interface with such cryptocurrency exchanges to view information relating to certain cryptocurrencies (e.g., on the display 54) and/or to buy, sell, and/or trade various cryptocurrencies.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (e.g., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination of one or more of them).

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A financial education tool, comprising:
a body portion;
a basin disposed within the body portion;
a receptacle into the body portion, wherein the receptacle is configured to receive physical currency into the basin;
a counter configured to detect receipt of the physical currency into the basin;
an inflation system coupled to or disposed within the body portion, wherein the inflation system comprises a bladder and an inflator;
a display disposed on or integral with the body portion;
a user interface configured to receive a user input from a user of the financial education tool; and
at least one processor communicatively coupled to the display and the user interface, wherein the at least one processor is configured to:
communicate with a server configured to manage a banking account of the user; and
in response to receiving the user input at the user interface, detecting receipt of the physical currency by the counter, or both, instruct the display to display information relating to the banking account of the user and instruct the inflation system to expand the bladder with the inflator based on detecting receipt of the physical currency.

2. The financial education tool of claim 1, wherein the display is a touch-screen display, and wherein the user interface comprises a graphical user interface displayed on the touch-screen display.

3. The financial education tool of claim 1, wherein the information comprises an account balance of the banking account, an amount of the physical currency detected by the counter, pending withdrawals from the banking account, pending deposits to the banking account, target savings indicators, or a combination thereof.

4. The financial education tool of claim 1, wherein the at least one processor is configured to:
receive a deposit package from an external source, wherein the deposit package includes an indication of funds to be transferred to the banking account and a recorded message; and
in response to receiving an additional user input at the user interface:
instruct the display to display an updated balance of the banking account reflecting the funds transferred to the banking account; and
instruct an output device of the financial education tool to output the recorded message.

5. The financial education tool of claim 4, comprising a mobile device configured to generate the recorded message and transmit the recorded message to the at least one processor, wherein the recorded message comprises an audio message, a video message, or both.

6. The financial education tool of claim 1, wherein the at least one processor is configured to:
prior to instructing the display to display the information relating to the banking account, execute a user authentication sequence, comprising:
acquiring feedback indicative of biometric data of the user;
comparing the feedback to known biometric data of the user; and
determining whether the biometric data matches the known biometric data.

7. The financial education tool of claim 6, comprising a camera or a fingerprint sensor coupled to the body portion and communicatively coupled to the at least one processor, wherein the camera or the fingerprint sensor is configured to provide the feedback.

8. The financial education tool of claim 6, wherein the body portion is shaped like an animal or character, and wherein the financial education tool comprises a camera positioned proximate an eye of the animal or character, the camera being communicatively coupled to the at least one processor and configured to provide the feedback.

9. The financial education tool of claim 1, comprising a card charging system coupled to the body portion and communicatively coupled to the at least one processor, wherein the at least one processor is configured to operate the card charging system to:

electronically transfer funds from the banking account to an account card;

electronically transfer funds from the account card to the banking account; or both.

10. The financial education tool of claim 1, wherein the counter is configured to count a value of the physical currency inserted into the receptacle, wherein the counter is configured to provide the at least one processor with feedback indicative of the value, and the at least one processor is configured to transmit a signal to the server to update a balance of the banking account based on the feedback.

11. The financial education tool of claim 1, comprising:
a tracking beacon coupled to the body portion and configured to provide the at least one processor with feedback indicative of a location of the financial education tool, wherein the at least one processor is configured to generate an alert in response to a determination that the location of the financial education tool departs from a target area designated for the financial education tool.

12. The financial education tool of claim 1, comprising a dispenser configured to eject all or a portion of the physical currency in response to an input indicative of a requested amount of the physical currency.

13. The financial education tool of claim 1, wherein the body portion is portable and the inflator comprises a fan.

14. A system, comprising:
a server configured to host a banking account for a user; and
a financial education tool communicatively coupled to the server, wherein the financial education tool comprises:
a body portion;
a basin within the body portion;
a receptacle through the body portion and configured to receive physical currency into the basin;
a counter configured to count the physical currency and provide currency value data based on counting the physical currency;
a user interface coupled to the body portion and configured to receive a user input; and
a processor housed within the body portion and communicatively coupled to a display of the financial education tool and the user interface, wherein the processor is configured to instruct the display to display information relating to the banking account of the user in response to receiving the user input at the user interface and in response to the currency value data and to output a graphical icon such that a size of the graphical icon is adjusted based on a balance in the banking account.

15. The system of claim 14, comprising the display, wherein the information comprises an account balance of the banking account, pending withdrawals from the banking account, pending deposits to the banking account, target savings indicators, or a combination thereof.

16. A system, comprising:
a server configured to host a banking account for a user; and
a financial education tool communicatively coupled to the server, wherein the financial education tool comprises:
a body portion;
a basin within the body portion;
a receptacle through the body portion and configured to receive physical currency into the basin;
a counter configured to count the physical currency and provide currency value data based on counting the physical currency;
an inflation system coupled to or disposed within the body portion, wherein the inflation system comprises a bladder and an inflator, wherein the inflator is configured to direct fluid into and/or out of the bladder;
a user interface coupled to the body portion and configured to receive a user input; and
a processor housed within the body portion and communicatively coupled to a display of the financial education tool and the user interface, wherein the processor is configured to:
instruct the display to display information relating to the banking account of the user in response to receiving the user input at the user interface and/or in response to the currency value data; and
output a graphical icon such that a size of the graphical icon is adjusted based on a balance in the banking account.

17. The system of claim 16, wherein the inflation system is configured to receive instructions to expand the bladder with the inflator based on receiving an indication that a deposit is made to the banking account of the user.

18. The system of claim 17, wherein the inflator comprises a fan and the processor is configured to instruct the fan to expand the bladder for a predetermined time period.

19. The system of claim 16, wherein the processor is configured to instruct the display to reduce the size of the graphical icon in response to a withdrawal made from the banking account.

20. The system of claim 16, wherein the processor is configured to instruct the display to increase the size of the graphical icon in response to a deposit made to the banking account.

* * * * *